United States Patent [19]

Bausch

[11] Patent Number: 4,861,005
[45] Date of Patent: Aug. 29, 1989

[54] THREE FLUID CHAMBER MOUNTING FOR RESILIENT, VIBRATION-DAMPING MOUNTING OF COMPONENTS

[75] Inventor: Paul Bausch, Hattenheim, Fed. Rep. of Germany

[73] Assignee: General Motors Corporation, Detroit, Mich.

[21] Appl. No.: 211,633

[22] Filed: Jun. 27, 1988

[30] Foreign Application Priority Data

Sep. 11, 1987 [DE] Fed. Rep. of Germany ....... 3730582

[51] Int. Cl.⁴ .............................................. F16M 5/00
[52] U.S. Cl. ................... 267/140.1; 248/562
[58] Field of Search ........... 267/35, 121, 140.1, 267/219, 293, 64.23, 64.27, 64.28; 180/300, 312; 248/562, 566, 550, 635, 636, 638; 123/192 R, 195 A

[56] References Cited

U.S. PATENT DOCUMENTS

| | | | |
|---|---|---|---|
| 4,673,169 | 6/1987 | Heitzig | 267/140.1 |
| 4,768,760 | 9/1988 | Le Fol | 267/140.1 |

FOREIGN PATENT DOCUMENTS

| | | | |
|---|---|---|---|
| 3043113 | 6/1981 | Fed. Rep. of Germany. | |
| 3214037 | 10/1983 | Fed. Rep. of Germany | 180/312 |
| 3617787 | 11/1986 | Fed. Rep. of Germany. | |
| 2394715 | 1/1979 | France | 267/219 |
| 0002934 | 1/1986 | Japan | 267/140.1 |

*Primary Examiner*—Robert J. Oberleitner
*Attorney, Agent, or Firm*—R. L. Phillips

[57] ABSTRACT

A mounting for resilient, vibration-damping mounting of components, in particular vehicle components, is constructed as an inner portion, an outer portion surrounding the inner portion at a distance and an elastomeric body disposed between the inner portion and the outer portion. The elastic body has recesses forming fluid chambers which communicate with each other via a throttle pipe and an additional fluid chamber is provided as a pressure chamber for receiving a compressible fluid, wherein the pressure chamber communicates with the fluid chambers connected via the throttle pipe so as to make the manufacture of the mounting simpler and less expensive and to make the setting of the predetermined damping characteristics highly reliable on a broad range.

6 Claims, 1 Drawing Sheet

THREE FLUID CHAMBER MOUNTING FOR RESILIENT, VIBRATION-DAMPING MOUNTING OF COMPONENTS

TECHNICAL FIELD

The present invention pertains to a mounting for resilient, vibration-damping mounting of components, in particular vehicle components, comprising an inner portion, an outer portion surrounding the inner portion at a distance and an elastomeric body which connects the inner portion to the outer portion and which contains recesses forming fluid chambers which communicate with each other via a throttle pipe.

BACKGROUND OF THE INVENTION

A mounting is known from DE-OS No. 30 43 113, which comprises a sleeve-like inner portion, a sleeve-like outer portion and an essentially ring-shaped elastomeric body disposed between the inner portion and the outer portion whose outer circumference is provided with two diametrically opposed recesses. The recesses communicate with each other via throttle pipes extending in a radial plane along the outer circumference of the elastomeric body. The recesses and the throttle pipes are filled with a fluid. The components to be mounted are resiliently mounted over the elastomeric bodies. If vibrations occur, the fluid flows from one recess into the other, and the vibrations are thus damped as a consequence of flow resistance to the throttle pipes. The damping characteristics are dependent on the cross section and the length of the throttle pipes as well as the viscosity of the liquid, which makes it necessary to strictly maintain the dimensions and thus to maintain undesirably close manufacturing tolerances. In addition, variation of the damping capacity is possible only within a limited range because of the relatively short length of the throttle pipes.

In the mounting according to DE-OS 36 17 787, recesses filled with a fluid are provided in the elastomeric body disposed between a sleeve-like inner portion and a sleeve-like outer potion. The recesses are connected to each other by a throttle pipe which has an essentially helical shape and which is provided in a separate ring-shaped member disposed on the outer circumference of the elastomeric body. The damping characteristics are dependent on the cross section and the length of the throttle pipe and are also only variable within limits in the case of this mounting. Deviations in the cross section of the throttle pipe cause, in an undesirable manner, shifts in the frequency at which the maximum degree of damping occurs. To avoid this, it is necessary to strictly maintain the manufacturing tolerances, which makes manufacture expensive.

SUMMARY OF THE INVENTION

The present invention offers a simple mounting which can be manufactured at low cost and in which the damping characteristics can be reliably adjusted to predetermined values in a broad range regardless of the dimensions of the throttle pipe or orifice.

This task is accomplished according to the present invention with an additional fluid pressure chamber that communicates with the normal fluid chambers connected via the throttle pipe. Both the damping characteristics and the spring rate or buffering rate of the mounting can be determined, in a simple manner, by the pressure of the compressible fluid even after assembly, so that it advantageously becomes unnecessary to develop and to stock a great number of mountings with predetermined rigidity and damping and of different designs The spring rate or buffering rate and the damping can be kept at a low level in a directly interrelated manner, which reduces the transmission of vibration energy Together with the compressibility of the fluid, the direct mutual dependence of the spring rate and the damping leads in advantageous manner to a frequency-selective damping characteristic; resonant vibration can be greatly damped in a specific manner, even without reaching great damping in the super critical range, i.e., beyond the frequency at the damping maximum, as it happens due to the damping characteristics of, e.g., rubber parts of a mounting.

A different damping characteristic of the fluid chambers acting as the damping chambers and consequently direction-dependent differences in damping can be achieved, if desired, in a simple manner with an arrangement in which the throttle pipe has throttle elements preceding each of the fluid chambers and in which a fluid pipe leading from the pressure chamber to the throttle elements is provided. In such an arrangement, it is possible to set equal as well as different damping characteristics of the damping chambers. Equal damping characteristics can be achieved by equal dimensioning of the throttle elements, and different damping characteristics can be achieved by unequal dimensioning of the throttle elements.

In a preferred embodiment of the present invention, at least two fluid chambers equipped with throttle elements are provided, which are arranged diametrically relative to the axis of the mounting.

An advantageous freedom of shaping for the fluid chambers or the pressure chamber is achieved with an arrangement in which the pressure chamber is spaced apart from the fluid chambers provided with the throttle elements in the axial direction. To limit the amplitude of vibrations in the radial direction by a buffer means, the pressure chamber is diametrically opposed by a recess in the elastomeric body into which no pressure can be admitted and in which there is provided an extension extending in the radial direction. The extension can be made to abut against the inner wall of the sleeve-like outer portion to limit the vibrations. To simplify the design of the mounting and its manufacture, it is advantageous to dispose at least two fluid chambers provided with throttle elements in a common radial plane and to have a common fluid pipe originating from the pressure chamber leading to the throttle elements in the radial plane.

It is also possible to provide two fluid chambers equipped with throttle elements in two radial planes arranged in the axial direction on both sides of the pressure chamber.

Particularly simple manufacture of the necessary fluid pipes is possible in an improved variant of the present invention, in which the inner portion, constructed as a pin, passes through the bearing, in which the fluid chambers in the elastomeric body end at the surface of the pin, and in which a bore provided in the pin, which serves as a fluid pipe and as an opening through which pressure is admitted, is connected to the fluid chambers via the throttle elements provide din the pin and ends in the pressure chamber.

An improved variant of the present invention, in which the recesses in the elastomeric body are outwardly open in the radial direction, in which the elastomeric body is vulcanized in a sleeve-like component provided with openings for vulcanization, and in which the component is surrounded by an outer portion designed as a sleeve and having an elastomeric inner layer, sealing the recesses, is favorable from the viewpoint of manufacture.

If a compresses gas source or a central compressed air supply system is available in the vehicle or during the assembly of the vehicle, the mounting can be filled and pressurized by connecting it to such a pressure source in a particularly simple manner.

If the pressure chamber for receiving the compressible fluid is connected to a central compressed air or compressed gas source of a vehicle via a pressure regulator, the damping and the spring rate of the mounting can be optimally controlled as a function of the vibration characteristics by controlling the pressure in the pressure chamber.

A preferred embodiment of the present invention is shown in the drawings and will be described below in greater detail:

Figure 1:
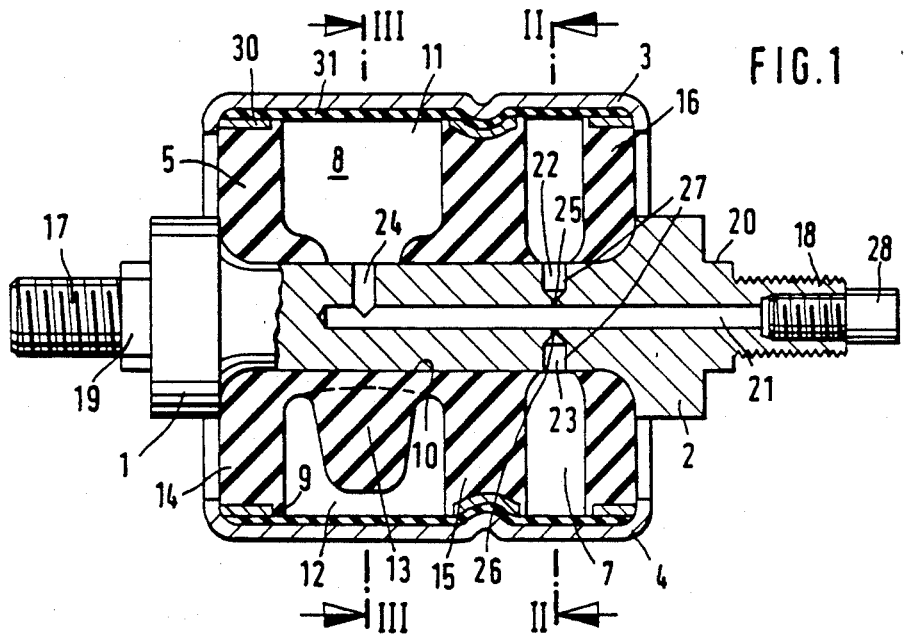
FIG. 1 shows a sectional view through the mounting according to the present invention.

The mounting comprises an inner portion 1 in the form of a pin 2, an outer portion 3 in the form of a sleeve 4, which is coaxial with the pin 2, and an elastomeric body 5 connected with these parts.

Figure 2:
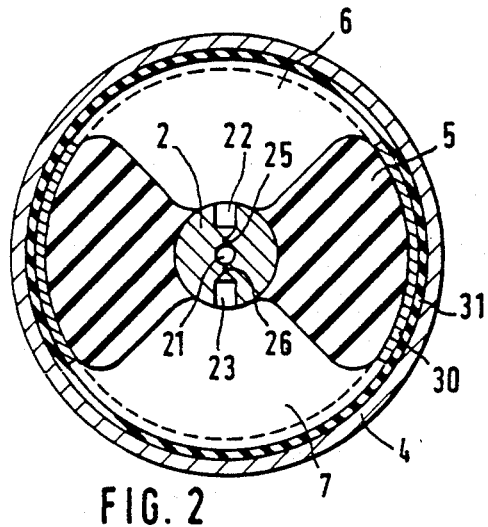
FIG. 2 shows a section along line 2—2 in FIG. 1.

The elastomeric body 5 is essentially ring-shaped and has recesses forming fluid chambers 6, 7 and 8. The fluid chambers 6, 7 and 8 extend from the outer generated surface 9 of the ring-shaped body 5 to the generated surface of the central through-opening 10 of the ring shaped body 5. The fluid chambers 6 and 7 are disposed in a common radial plane of the body 5 and have equal width in the axial direction, as well as equal, quarter circle-shaped cross sections in the radial plane which expand radially in the shape of a V in the outward direction, as is clearly apparent from FIG. 2.

Figure 3:
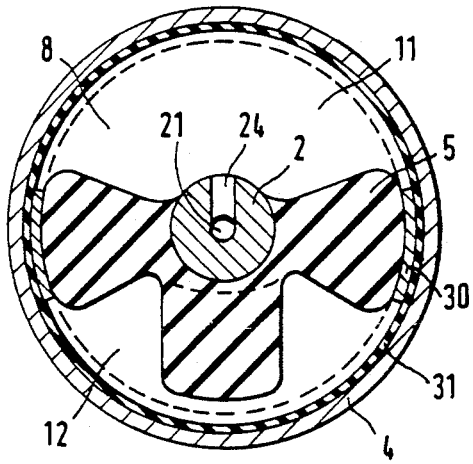
FIG. 3 shows a section along line 3—3 in FIG. 1.

Spaced axially from the fluid chambers 6 and 7 is the fluid chamber 8, which has approximately twice the width of the fluid chambers 6 and 7 and an almost semicircular cross section in the radial plane associated therewith (see FIG. 3). As is apparent from FIGS. 2 and 3, the fluid chambers 6 and 8 are arranged with their axes of symmetry in the axial direction and essentially aligned. The fluid chamber 8 is designed as a pressure chamber 11 to receive a compressible fluid.

The recess 12, which is separated from the central through-opening 10 of the body 5 and which is only open to the outer generated surface of the body 5, is radially aligned with and diametrically opposed to the pressure chamber 11. This recess has essentially the same shape as the pressure chamber 11, but is provided with a radially extending extension 13 originating from the wall to limit the amplitudes of vibration in the radial direction In its rest position, the extension 13 is spaced apart from the outer portion 3 and from the sleeve 4 and cooperates with the inner wall of the outer portion 3 to limit the amplitudes of vibration.

The fluid chambers 6, 7 and 8, as well as the recess 12, are limited in the axial direction by elastomeric walls 14, 15 and 16 of approximately equal thickness.

The elastomeric body is vulcanized onto the pin 2 passing through the central hole 10 or is attached according to another conventional method. The pin 2 is provided with threads 17, 18 at both ends, as well as with a bore 21 originating from an end face, which bore is provided with cross bores 22, 23 and 24 which open into the fluid chambers 6, 7 and 8. The cross bores 22 and 23 are provided with throttle portions 25 and 26 in the form of contractions at their radial inner ends and form throttle passages generally designated as 27 which connects the fluid chambers 6 and 7. At its front end, the bore 21 is provided with a thread onto which is screwed a valve member 28.

In a manner not shown, it is possible to provide two more fluid chambers, whose arrangement and dimensions correspond to those of the fluid chambers 6 and 7, on the axially opposite side of the pressure chamber 11 in addition to the fluid chambers 6 and 7; these additional fluid chambers also being provided with a throttle element each.

The elastomeric body is vulcanized into a sleeve-like component 30 which has openings on its surface which essentially correspond to the openings of the fluid chambers 6, 7 and 8, as well as to the recess 12 in the elastomeric body 5, and which make the vulcanization of these recesses possible. The component 30 is surrounded by the sleeve 4; an elastomeric layer 31 for sealing the fluid chambers 6, 7 and 8 is provided between the component 30 and the sleeve 4. The sleeve 4 is rolled in or beaded for sealing in the region of the walls 14, 15 and 16.

The mounting shown is intended as an engine suspension. The mounting is pressed with the sleeve 4 into one of the holders provided on the engine-transmission unit and fastened to the holder with a self-locking nut placed, e.g., onto the threaded part 17 of the pin 2, so that an interlocking connection is obtained due to the engagement of the surface 19 with matching opening on the holder. When the engine-transmission unit is mounted on the vehicle, the pin 2 with its threaded end is pushed into slots of the holder on the vehicle chassis frame and fastened with self-locking nuts to the holder and thus to the vehicle chassis frame. Due to engagement, e.g., of the surface 20 with a matching surface of the holder, an interlocking nonrotatable connection is obtained.

The pressure chamber 11 is filled with a compressible fluid via the valve element 28 and pressurized. The compressible fluid is a gas or a gas mixture, especially air. The fluid chambers 6 and 7 are also filled with fluid through the connecting pipe between the pressure chamber 11 and the fluid chambers 6 and 7, i.e. the bore 21 and the cross bores 22, 23 and 24; finally in the steady state, the pressure is the same in the fluid chambers 6 and 7 as in the pressure chamber 11.

The pressurized pressure chamber 11 as well as the rigidity of the walls 14, 15 and 16 made from elastomeric material determine the total spring rate of the mounting.

In the case of vibrations, fluid flows through the throttle elements 25 and 26 to equalize the pressure between the three fluid chambers 6, 7 and 8 as a consequence of volume changes of the fluid chambers 6, 7 and/or 8. The vibrations are damped due to the fact that the throttle elements 25 and 26 are provided, and the vibrations can also be influenced by the cross section and the length of the throttle contractions of the cross bores 22 and 23 and also by the fluid selected and by the fluid filling pressure. If the valve element 28 is designed as a filling valve, the damping and the spring rate of the mounting can be set or adjusted by changing the filling pressure. The valve element 28 may also be designed as a control valve and be connected, e.g., to a compressed gas source of the vehicle; by adjusting the pressure in the pressure chamber 11, the damping and the spring rate of the mounting can be optimally controlled as a function of the vibration characteristics.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiment of the invention in which an exclusive property or privilege is claimed are defined as follows:

1. Mounting comprising an inner portion, an outer portion surrounding the inner portion at a distance, and an elastomeric body disposed between the inner portion and outer portion having recesses which form first and second fluid chambers an unrestricted fluid passage in said inner portion, separate throttle passages connecting said first and second fluid chambers to said unrestricted fluid passage, characterized in that said elastomeric body has an additional recess forming a third fluid chamber and an unthrottled passage connecting said third chamber to said unrestricted fluid passage whereby said third chamber is connected by said separate throttle passages to said first and second fluid chambers.

2. Mounting according to claim 1, characterized in that said first and second fluid chambers are arranged diametrically with respect to an axis extending centrally of the mounting and said third chamber is axially spaced from said first and second fluid chambers.

3. Mounting according to claim 2 characterized in that diametrically opposite said third fluid chamber is an extension on said elastomeric body extending in the radial direction for limiting in cooperation with said outer portion the amplitude of vibrations in the radial direction.

4. Mounting according to claim 2 characterized in that the recesses in the elastomeric body open radially outwards, the elastomeric body is incorporated by vulcanization in a sleeve-like component provided with openings for vulcanization of the recesses, and the component is sealingly surrounded by the outer portion which comprises an elastomeric inner layer and is constructed as a sleeve.

5. Mounting according to claim 1, characterized in that the inner portion is constructed as a pin that passes through the mounting, the fluid chambers in the elastomeric body end at the pin surface, the fluid passage is constructed as an axial bore in said pin, the throttle passages are constructed as restricted radial bores in said pin, and said unthrottled passage is constructed as an unrestricted radial bore in said pin.

6. Mounting according to claim 1, characterized in that said chambers are charged with a gas.

* * * * *